US007239107B1

(12) United States Patent
Ferreira et al.

(10) Patent No.: US 7,239,107 B1
(45) Date of Patent: Jul. 3, 2007

(54) FLEXURE STAGE

(75) Inventors: Placid M. Ferreira, Champaign, IL (US); Qing Yao, Pearland, TX (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 11/362,605

(22) Filed: Feb. 24, 2006

(51) Int. Cl.
*B64C 17/06* (2006.01)
*B66C 23/16* (2006.01)
*H02P 1/00* (2006.01)

(52) U.S. Cl. .................... 318/649; 318/640; 318/569; 318/575; 355/72; 355/53; 74/782; 74/521

(58) Field of Classification Search ............... 318/575, 318/569, 640, 649, 625, 568.21; 355/53, 355/72; 73/521, 782
See application file for complete search history.

(56) References Cited

U.S. PATENT DOCUMENTS

| 5,140,242 | A | * | 8/1992 | Doran et al. ............... 318/640 |
| 5,267,818 | A | * | 12/1993 | Marantette ................. 409/132 |
| 5,294,757 | A | * | 3/1994 | Skalski et al. .............. 187/393 |
| 5,321,217 | A | * | 6/1994 | Traktovenko et al. ...... 187/409 |
| 5,322,144 | A | * | 6/1994 | Skalski et al. .............. 187/393 |
| 5,854,487 | A |   | 12/1998 | Braunstein et al. |
| 6,310,342 | B1 |   | 10/2001 | Braunstein et al. |
| 6,324,933 | B1 |   | 12/2001 | Waskiewicz et al. |
| 6,453,566 | B1 |   | 9/2002 | Bottinelli et al. |
| 6,466,324 | B1 |   | 10/2002 | Doran |
| 6,484,602 | B1 |   | 11/2002 | Dagalakis et al. |
| 6,498,892 | B1 |   | 12/2002 | Harman |
| 6,543,740 | B2 |   | 4/2003 | Gaunt et al. |
| 6,555,829 | B1 |   | 4/2003 | Spallas et al. |
| 6,606,444 | B2 |   | 8/2003 | Harman et al. |
| 6,614,605 | B2 | * | 9/2003 | Auracher et al. ........... 359/824 |

(Continued)

FOREIGN PATENT DOCUMENTS

WO         WO 00/63979         10/2000

OTHER PUBLICATIONS

Peng Gao, et al.; A New Piezodriven Precision Micropositioning Stage Utilizing Flexure Hinges; Nanotechnology 10, 1999, pp. 394-398, IOP Publishing Ltd., UK.

(Continued)

*Primary Examiner*—Paul Ip
(74) *Attorney, Agent, or Firm*—Krieg DeVault LLP; L. Scott Paynter, Esq.

(57) ABSTRACT

In one embodiment, a flexure stage comprises a base, a stage, a positioning mechanism, and a control device. The base and stage have first and second portions that are spaced apart from each other. The positioning mechanism is coupled between the base and the stage. The positioning mechanism includes an actuator and a flexure structure engaged by the actuator. The flexure structure includes base links coupled to the first base portion, stage links coupled to the first stage portion, and an intermediate link coupled to both the base and stage links. All structures are coupled by flexure hinge connections. The control device generates a control signal to change position of the stage by sending a control signal to the actuator which provides a force to elastically deform the flexure structure and correspondingly move the stage.

21 Claims, 7 Drawing Sheets

U.S. PATENT DOCUMENTS

| | | | |
|---|---|---|---|
| 6,624,548 B1* | 9/2003 | Miller et al. | 310/307 |
| 6,677,697 B2 | 1/2004 | Struckmeier et al. | |
| 6,688,183 B2* | 2/2004 | Awtar et al. | 73/782 |
| 6,746,172 B2 | 6/2004 | Culpepper | |
| 6,806,991 B1 | 10/2004 | Sarkar et al. | |
| 6,860,020 B2* | 3/2005 | Pahk et al. | 33/1 M |
| 6,871,548 B2 | 3/2005 | Helmer et al. | |
| 6,891,601 B2 | 5/2005 | Jeanne et al. | |
| 2002/0005679 A1 | 1/2002 | Elings et al. | |
| 2002/0021480 A1* | 2/2002 | Auracher et al. | 359/244 |
| 2002/0150398 A1 | 10/2002 | Choi et al. | |
| 2003/0086751 A1 | 5/2003 | Culpepper | |
| 2004/0138766 A1* | 7/2004 | Pahk et al. | 700/61 |
| 2004/0149067 A1* | 8/2004 | Pahk et al. | 74/490.09 |
| 2005/0005688 A1 | 1/2005 | Samsavar et al. | |
| 2005/0198844 A1* | 9/2005 | Lee et al. | 33/1 M |

OTHER PUBLICATIONS

Brenan, C. et al.; Characterization and Use of a Novel Optical Posiiton Sensor for Microposition Control of a Linear Motor; Rev. Sci. Instrum. 64 (2), 1993, pp. 349-356.

Chen, et al.; Finite Element Analysis of a Scanning X-Ray Microscope Micropositioning Stage; Rev. Sci. Instrum. 63(1), 1992; pp. 591-594; American Institute of Physics.

Yang et al.; Design and Characterization of a Low-Profile Micropositioning Stage; Precision Engineering 18:20-29, 1996, USA.

Sugihara, et al.; Piezoelectrically Driven XYθ Tablefor Submicron Lithography Systems; Rev. Sci. Instrum. 60 (9), 1989; pp. 3024-3029; American Institute of Physics.

Castaneda, et al.; Micropositioning Device for Automatic Alignment of Substrates for Industrial-Scale Thin Films Deposition; Assembly Automation 21 (4), 2001, pp. 336-340.

Muthuswamy et al.; A Chronic Micropositioning System for Neurophysiology; IEEE 2002; pp. 2115-2116; USA.

Stilson, et al.; High-Speed Solution Switching Using Piezo-Based Micropositioning Stages; IEEE 48 (7), 2001; pp. 806-814.

Smith, et al.; A New High-Resolution Two-Dimensional Micropositioning Device for Scanning Probe Microscopy Applications; REv. Sci. Instrum. 65 (10), 1994, 3216-3219.

Pham et al.; Kinematics, Workspace and Static Analyses of 2-DOF Flexure Parallel Mechanism; Robotics and Vision, 2002, Singapore.

Chang, et al.; An Ultra-Precision XYθz Piezo-Micropositioner Part I: Design and Analysis; IEEE 46 (4), 1999, pp. 897-905.

Lee, et al.; A New 3-DOF Z-Tilts Micropositioning System Using Electromagnetic Actuators and Air Bearings; Precision Engineering 24 (2000), pp. 24-31.

Kolb, et al.; Capacitive Sensor for Micropositioning in Two Dimensions; Rev. Sci. Instrum. 69 (1), 1998; pp. 310-312; American Institute of Physics.

Chonan, et al.; Soft-Handling Gripper Driven by Piezoceramic Bimorph Strips, Smart Mater, Struct. 5 (1996) pp. 407-414; IOP Publishing Ltd.; UK.

Downs; A Proposed Design for an Optical Interferometer with Subnanometric Resolution; Nanotechnology 1 (1990) pp. 27-30; IOP Publishing Ltd.; UK.

Smith, et al.; A New High-Resolution Two-Dimensional Micropositioning Device for Scanning Probe Microscopy Applications; Rev. Sci. Instrum. 65 (10), 1994; pp. 3216-3219.

Judy, et al.; A Linear Piezoelectric Stepper Motor With Submicrometer Step Size and Centimeter Travel Range; IEEE, vol. 37, No. 5, 1990; pp. 428-437.

Cavallo, et al.; Feedback Control Systems for Micropositioning Tasks With Hysteresis Compensation; IEEE, vol. 40, No. 2, 2004, pp. 876-879.

Lin, et al.; Modeling and Hierarchical Neuro-Fuzzy Control for Flexure-Based Micropositioning Systems; Journal of Intelligent and Robotic Systems 32: 411-435, 2001; Netherland.

Tan, et al.; Micro-Positioning of Linear-Piezoelectric Motors Based on a Lerning Nonlinear PID Controller; IEEE, vol. 6, No. 4, 2001, pp. 428-436.

Vischer et al.; Kinematic Calibration of the Parallel Delta Robot; Robotica (1998) vol. 16, pp. 207-218; UK.

El-Khasawneh, et al.; Computation of Stiffness and Stiffness Bounds for Parallel Link Manipulators; International Journal of Machine Tools & Manufacture 39 (1999) 321-342.

Jaecklin, et al.; Comb Actuators For XY-Microstages; Sensors and Actuators A, 39 (1993) 83-89.

Hah, et al.; Low-Voltage, Large-Scan Angle MEMS Analog Micromirror Arrays With Hidden Vertical Comb-Drive Actuators; IEEE; vol. 13, No. 2, 2004; pp. 279-289.

Riley, et al.; A Critical Review of Materials Available for Health Monitoring and Control of Offshore Structures, date unknown, no date.

Ramsay et al.; Barium Titanate Ceramics for Fine-Movement Control; J. Sci. Instrum. 1962, vol. 39, pp. 636-637.

* cited by examiner

FLEXURE STAGE

GOVERNMENT RIGHTS

This invention was made with Government support under Contract Numbers 0328162 and 0422687 awarded by the National Science Foundation. The Government has certain rights in the invention.

BACKGROUND

The present invention relates to a flexure positioning device, and more particularly, but not exclusively relates to a flexure positioning device with pivot points corresponding to vertices of a parallelogram.

In certain flexure positioning device applications, it is desirable to position an object with no parasitic rotational effects. Standard control schemes are typically unequal to the task. Thus, there is an ongoing demand for further contributions in this area of technology.

SUMMARY

One embodiment of the present invention includes a unique flexure positioning technique. Other embodiments include unique apparatus, devices, systems, and methods for flexure positioning. Further embodiments, forms, objects, features, advantages, aspects, and benefits of the present application shall become apparent from the detailed description and drawings included herein.

DETAILED DESCRIPTION OF REPRESENTATIVE EMBODIMENTS

Figure 1:
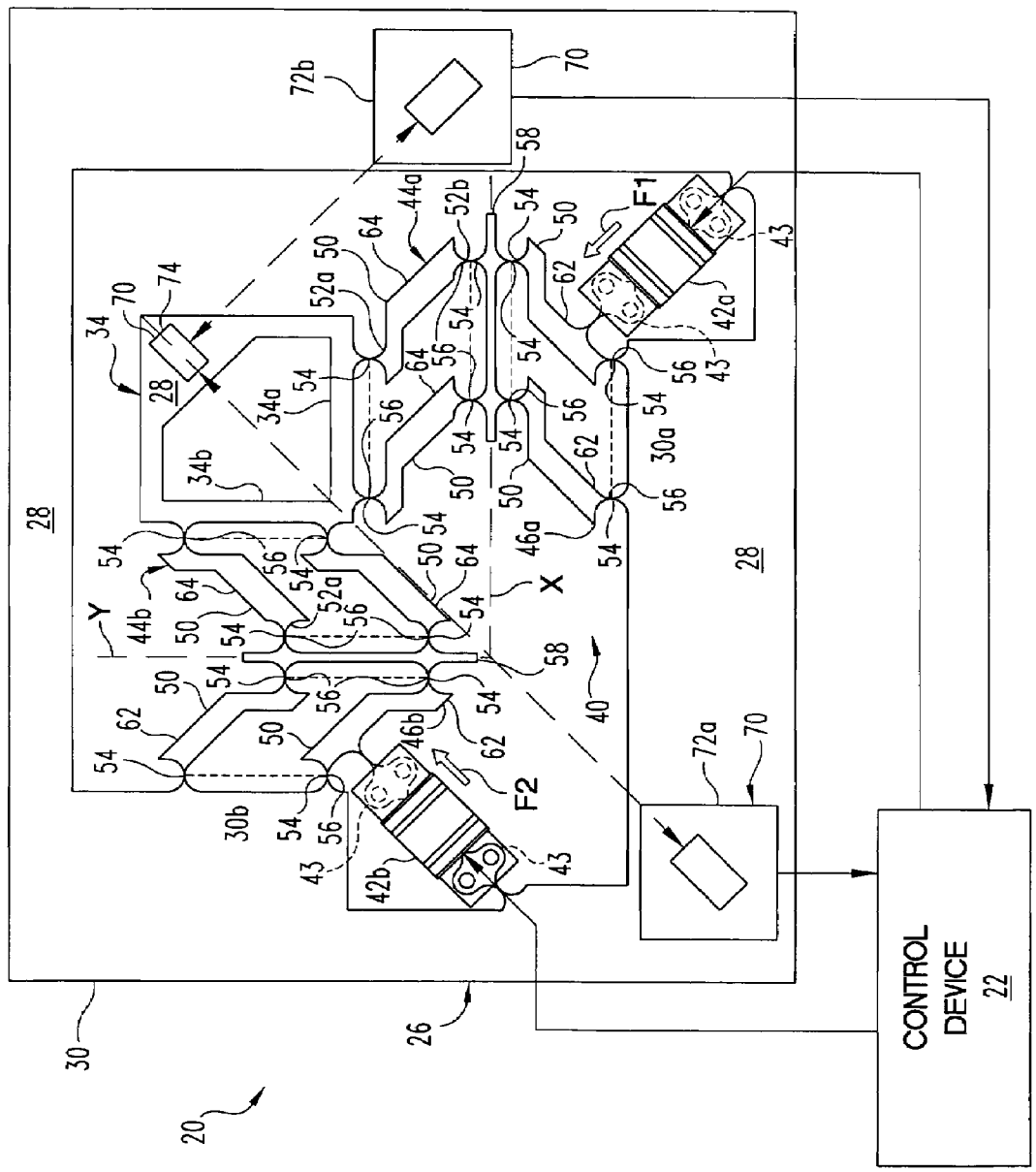
FIG. 1 is top plan view of a micropositioning system with selected aspects shown in schematic form.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

FIG. 1 depicts positioning system 20 of one embodiment of the present invention. System 20 includes control device 22 and flexure subsystem 26. Control device 22 is configured to supply position control signals to subsystem 26 and receive position feedback signals from subsystem 26. Subsystem 26 provides the capability to control the position of a designated effector stage in the nanoscale regime using a kinematic chain. In one form, translational movement over two ranges defines a planar positioning region of the system with little or no appreciable rotational movement. As one example, this planar region corresponds to the plane defined by the x and y axes shown in FIG. 1.

Subsystem 26 includes an approximately planar plate 28 with base 30. Sensing arrangement 70 and positioning mechanism 40 are coupled to base 30 of plate 28. Mechanism 40 includes stage 34, actuator 42a, actuator 42b, actuator mounting pads 43, translation adjustment flexure structure 44a, and translation adjustment flexure structure 44b. For the depicted embodiment, plate 28 is a monolithic structure from which material has been removed to define base 30, stage 34, pads 43, and structures 44a and 44b. Base 30, stage 34, pads 43, structure 44a, and structure 44b are interconnected by elastically deformable regions. These elastically deformable regions correspond to different flexures that are more specifically designated as flexure connections 54 in FIG. 1. Each flexure connection 54 is structured to provide a flexure hinge 56 that allows for pivotal rotation about a corresponding pivot point. Flexure hinges 56 are formed with a neck having a two-dimensional cross section at the pivot point with one dimension being substantially less than the other dimension to favor flexure with one degree of rotational freedom about the pivot point. However, in other embodiments a different flexure/hinge arrangement could be used that may favor one or more other degrees of freedom. The collective operation of flexure hinges 56 is more fully described in connection with FIGS. 2 and 3 hereinafter. Stage 34 includes stage portion 34a and stage portion 34b, and base 30 includes base portion 30a and base portion 30b. Flexure structure 44a is connected between base portion 30a and stage portion 34a, and flexure structure 44b is connected between base portion 30b and stage portion 34b.

Figure 2:
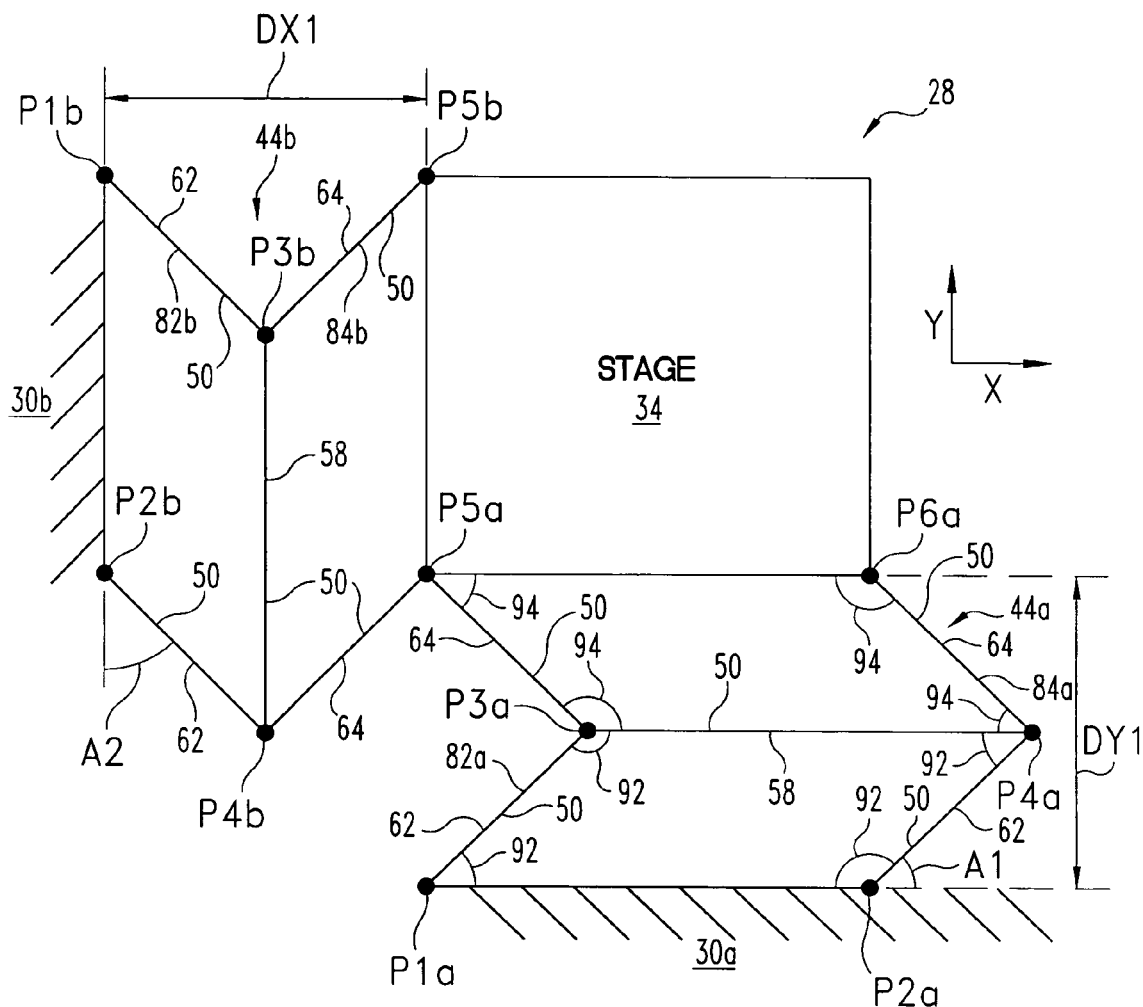
FIGS. 2 and 3 are diagrammatic views relating to the operation of the system of FIG. 1.
Figure 3:
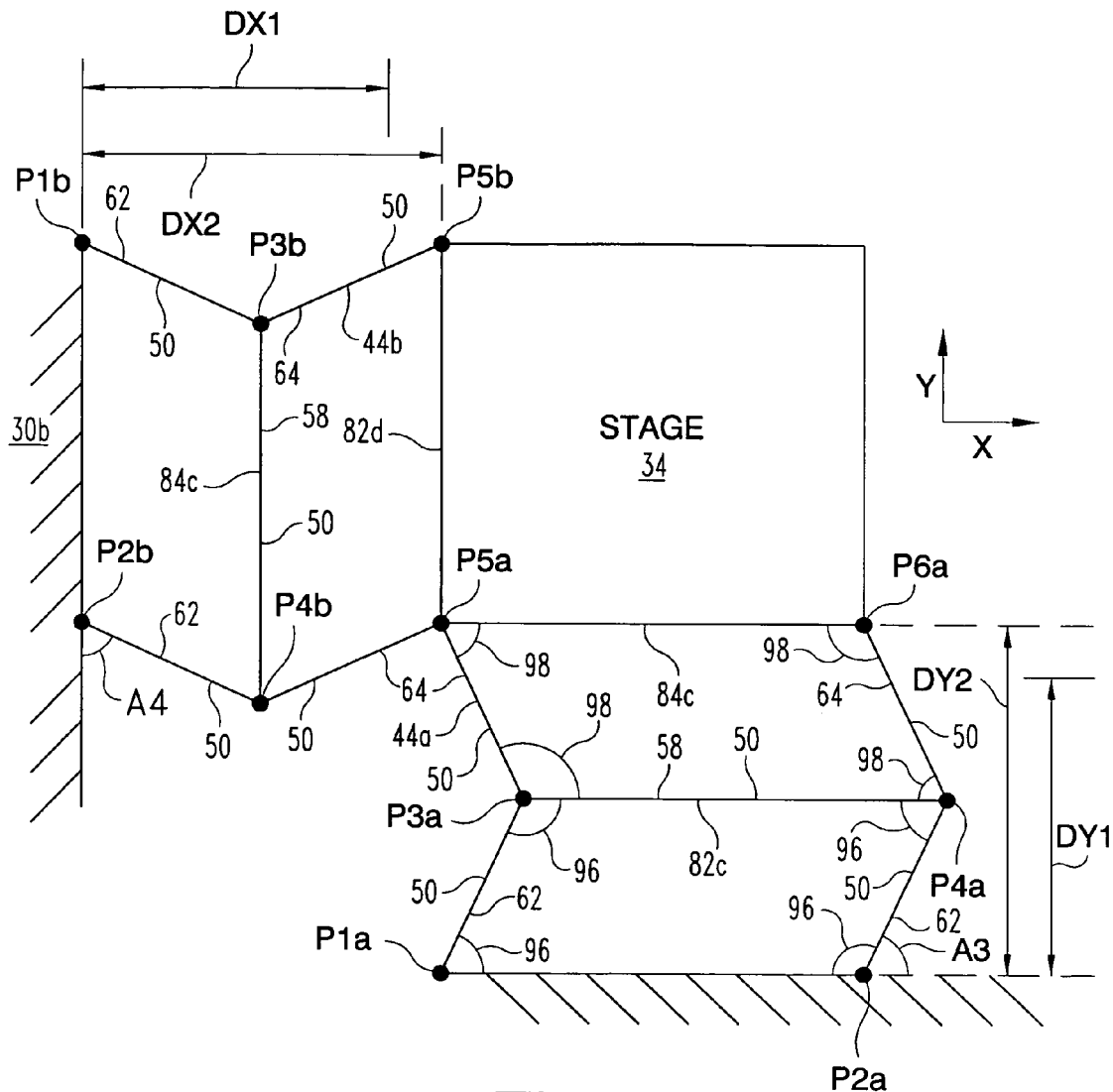

Flexure structures 44a and 44b are comprised of multi-bar linkages 46a and 46b respectively. Linkages 46a and 46b are composed of links 50, intermediate members 58, and pads 43 interconnected by corresponding flexure connections 54. Each link 50 includes end portion 52a and end portion 52b (only a few are specifically designated to preserve clarity). Referring additionally to FIGS. 2 and 3, structures 44 as and 44b each include two base links 62 and two stage links 64 for each of structures 44a and 44b, respectively. Base links 62 are coupled to base portions 30a and 30b of base 30 and one side of a corresponding intermediate member 58 via flexure connections 54. Stage links 64 are coupled to the opposite side of the corresponding intermediate member 58 via flexure connections 54 and to corresponding stage portions 34a and 34b. Intermediate members 58 are utilized to maintain base links 62 in substantially parallel alignment and stage links 64 in substantially parallel alignment. The substantially parallel alignment of base links 62 and stage links 64 tend to reduce parasitic rotational effects that may otherwise result from the movement of positioning mechanism 40.

One end of each actuator 42a and 42b is coupled to one of pads 43 that is in turn connected to base portion 30a or 30b, respectively. The opposing end of each actuator 42a and 42b is coupled to another of pads 43 that is in turn connected to base link 62 of structure 44a or 44b, respectively. Actuators 42a and 42b are each of a linear type that selectively changes its length in response to a signal input from control device 22. Correspondingly, a force F1 can be selectively imparted to flexure structure 44a by actuator 42a, and a force F2 can be selectively imparted to flexure structure 44b by actuator 42b in response to actuation signals output by control device 22. Forces F1 and F2 are symbolically represented by arrows directed towards the respective structures 44a and 44b; however, it should be understood that forces F1 and F2 may be tensile or compressive in nature, may vary in magnitude over time and relative to one another, and/or may be intermittently applied. In one embodiment, actuators 42a and 42b are of a piezoelectric type; however, different types as would occur to those skilled in the art could alternatively or additionally be utilized. By way of nonlimiting example, alternative actuators include: shape memory alloy (SMA) devices, electrostatic force devices such as comb drives, magnetorestrictive devices such as those based on Tertenol-D, electromagnetic devices, and the like.

FIG. 1 schematically depicts the signal flow from control device 22 to actuators 42a and 42b to vary the force applied. Control device 22 can be an electronic circuit comprised of one or more components that may include digital circuitry, analog circuitry, or both. Control device 22 may be software and/or firmware programmable; a hardwired, dedicated state machine; or a combination of these. In one embodiment, control device 22 is a programmable microprocessing device of a solid-state, integrated circuit type that includes one or more processing units and memory. Control device 22 functions in accordance with operating logic defined by programming, hardware, or a combination of these. In one form, control device 22 may store programming instructions in memory to embody at least a portion of this operating logic. Alternatively or additionally, control device 22 may store data that is manipulated by the operating logic of control device 22 in memory. Control device 22 can include signal conditioners, signal format converters (such as analog-to-digital and digital-to-analog converters), limiters, clamps, amplifiers or the like as needed to perform various control and regulation operations described in the present application. In one embodiment, a UMAC motion controller was used of the type provided by Delta Tau Data Systems, Inc. having a business address of 21314 Lassen Street, Chatsworth, Calif. 91311.

FIG. 1 also schematically depicts signal flow from sensors 72a and 72b of sensing arrangement 70 to control device 22. Sensing arrangement 70 generates the position feedback signals that are sent by subsystem 26 to control device 22. Sensing arrangement 70 includes sensor 72a, sensor 72b, and reflector 74. Sensors 72a and 72b are mounted on base 30 and reflector 74 is mounted as a sensing target on stage 34. Sensors 72a and 72b are each structured to generate a coherent light beam that is directed towards reflector 74, and detect the resulting reflection in such a manner that displacement along the x and y axes can be determined.

In one experimental embodiment with the UMAC motion controller, sensors 72a and 72b were of a fiber optic type, and reflector 74 included two polished rectangular silicon chips that were fixed to a steel block, which in turn was affixed to stage 34. Structures 44a and 44b for this experiment were formed from steel using wire-based Electrical Discharge Machining (EDM). For this experiment, a 16 bit analog-to-digital converter was used with a 10 volt range, to provide a digital format of the sensor output, the optic sensor had a 7.7 mV/micrometer sensitivity, and a linear amplifier was used to condition the actuator control signals. It should be appreciated that in other embodiments, the sensing arrangement may include one sensor and reflector, multiple sensors and reflectors, and/or a different type of sensing device suitable to provide signals indicative of position to control device 22. By way of nonlimiting example, alternative sensors include resistive, inductive, Hall effect, and capacitive types just to name a few.

In response to a sufficient change in force F1 and/or F2, the respective structure 44a and/or 44b elastically deforms at flexure connections 54. This deformation results in the links 50 pivoting relative to one another. FIG. 2 schematically depicts subsystem 26 in a state of rest with no deformation of connections 54—such that no force F1 or F2 is being applied with actuators 42a and 42b. It should be appreciated that subsystem 26 is in schematic form where flexure connections 54 and flexure hinges 56 are further represented by pivot points that each have a respective rotational axis perpendicular to the view plane. More specifically, flexure connections 54 and flexure hinges 56 that directly couple links 50 of linkages 46a and 46b to base 30, intermediate member 58, and stage 34; are represented by pivot points P1a–P6a and P1b–P6b, respectively. For the positional state shown in FIG. 2, stage 34 and base 30 are spaced apart a distance DX1 along the x axis and a distance DY1 along the y axis. It should be appreciated that distances DX1 and DY1 may be different in magnitude. Base links 62 form angles A1 and A2 with base portions 30a and 30b, respectively. In one embodiment, angles A1 and A2 are both less than 90° when subsystem 26 is in a rest state. It should be appreciated, however, that angles A1 and A2 may both be greater than or equal to 90° depending on flexure structure configuration.

As specifically depicted in FIG. 2, structures 44a and 44b each define two interconnected parallelograms with a common side corresponding to each intermediate member 58. More specifically, base portions 30a and 30b, base links 62, and intermediate members 58 correspond to simple quadrangles that are more particularly in the form of oblique parallelograms 82a and 82b; and stage portions 43a and 43b, stage links 64, and intermediate members 58 correspond to simple quadrangles that are more particularly in the form of oblique parallelograms 84a and 84b. Parallelograms 82a and 82b define interior angles 92. Parallelograms 84a and 84b define interior angles 94.

During operation, control device 22 is responsive to input from arrangement 70 to determine if a position of stage 34 has changed in an undesired manner. If it has, then control device 22 determines an appropriate positional change and translates that change into an adjustment to the forces F1 and/or F2 by sending corresponding signals to actuator 42a and/or 42b. Adjustments provided by feedback from sensing arrangement 70 can be made to maintain a fixed position, or can be in response to input from an operator or equipment (not shown) with arrangement 70 providing appropriate automated feedback to control/regulate the directed change. Alternatively or additionally, control device 22 can change force provided by actuator 42a and/or 42b based on execution of its operating logic and/or in response to an external input other than arrangement 70.

In response to a sufficient change in force F1 as applied with actuator 42a for the state shown in FIG. 2, structure 44a reconfigures by pivoting relative to pivot points P1a–P6a. Likewise in response to a sufficient change in force F2 as applied with actuator 42b for the state shown in FIG. 2, structure 44b reconfigures by pivoting relative to pivot points P1b–P6b. FIG. 3 depicts the resulting repositioning of stage 34 in response to sufficiently increased compressive forces F1 and F2 caused by lengthening of actuators 42a and 42b relative to the state shown in FIG. 2. In FIG. 3, stage 34 and base 30 are spaced apart distance DX2 along the x axis and distance DY2 along the y axis. For the depicted embodiment, distance DX2 is greater than distance DX1 and distance DY2 is greater than distance DY1 shown in FIG. 2. Base links 62 of linkages 46a and 46b form angles A3 and A4 with base portions 30a and 30b, respectively. Angles A3 and A4 are greater than angles A1 and A2 shown in FIG. 2. For the position shown in FIG. 3, parallelograms 82a and 82b of FIG. 2 are reconfigured as parallelograms 82c and 82d with interior angles 96; and parallelograms 84a and 84b of FIG. 2 are reconfigured as parallelograms 84c and 84d with interior angles 98. It should be appreciated that distances between the DX1 and DX2 along the x axis, and DY1 and DY2 along the y axis can be provided independent of one another by appropriate adjustment of the force applied with actuators 42b and 42a. It should be appreciated that member 58 of structure 44a is repositioned along the x axis as stage 34 is repositioned along the y axis, and member 58 of structure 44b is repositioned along the y axis as stage 34 is repositioned along the x axis. Accordingly, the axis of travel of each member 58 is transverse, and more specifically is approximately perpendicular, to the axis along which translation of stage 34 is adjusted for a given flexure structure 44a or 44b. Upon removal of any forces applied by actuators 42b and 42a, the elastic deformation of flexure connections 54 ceases, and links 50 of structures 44b and 44a pivot in relation to one another to return to the "at rest" position of mechanism 40, such as that shown in FIG. 2. Accordingly, position along a region of the x-y plane can be regulated with system 20.

In one experimental example based on the previously described fiber optic type of sensing arrangement, piezoelectric actuators were used with National Instruments model number PCI-6070E data acquisition circuit board. This circuit board was interfaced with a compatible computer programmed to receive stage position signals from the fiber optic sensors and send control signals to circuitry to drive the actuators. In an open-loop mode, resonant frequencies of two vibration modes of the stage were observed at 520 Hertz (Hz) and 537 Hz. The experimental system provided positional control along an 87 micrometer (μm) by 87 μm region (work zone). In a closed-loop mode, at least a 25 nanometer (nm) resolution was achieved with this experimental example. It has been surprisingly discovered that the translational adjustment of stage 34 with mechanism 40 can be performed with little or no appreciable parasitic rotational movement.

In one preferred embodiment of a micropositional system 20, at least 1000 nm positional resolution is provided, in a more preferred embodiment, at least 100 nm resolution is provided, and in an even more preferred embodiment, at least 25 nm resolution is provided. Nonetheless, it should be appreciated that in other embodiments poorer resolution may be desired and/or acceptable, often depending on the application.

Figures 4, 5:
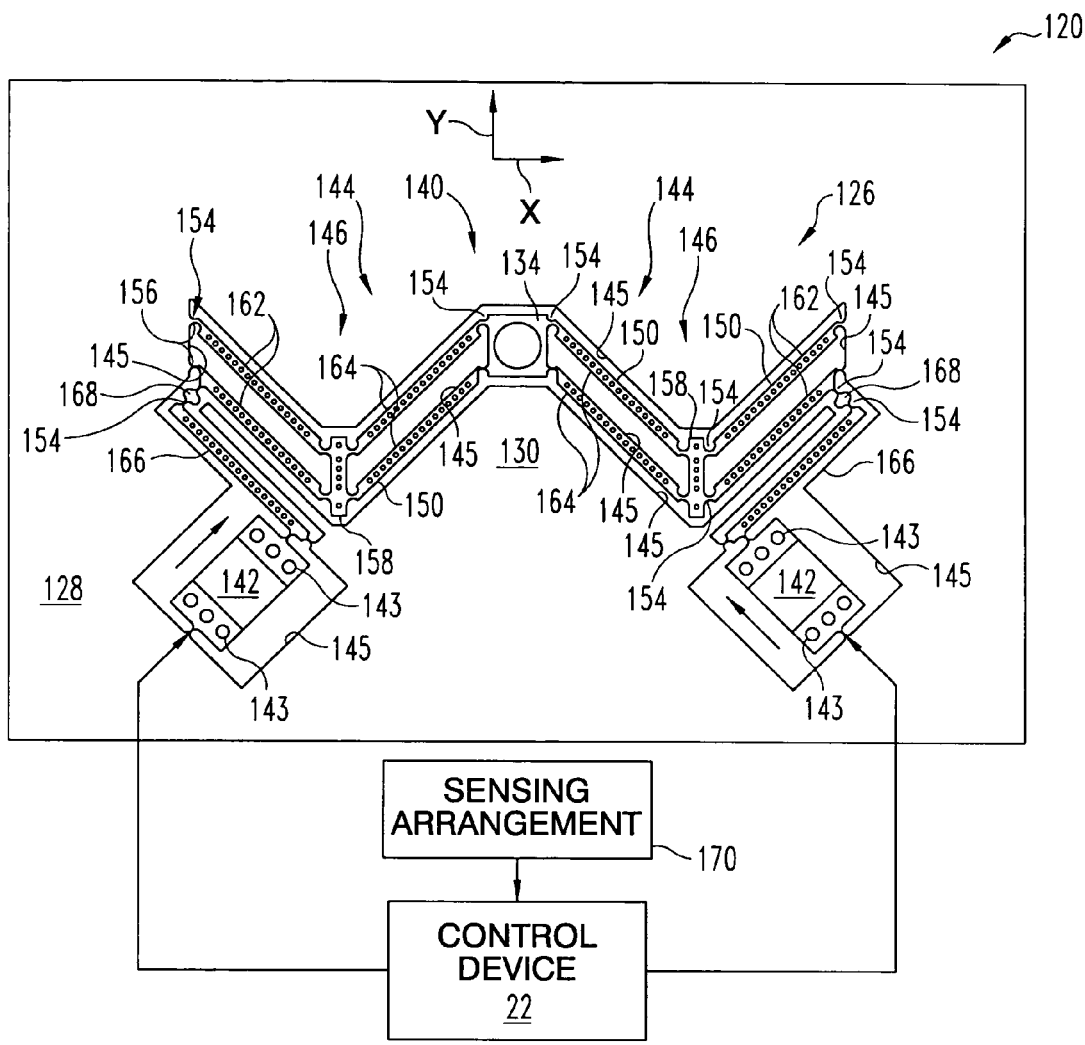
FIG. 4 is a top plan view of another type of micropositioning system with selected aspects shown in schematic form.
FIG. 5 is a diagrammatic view relating to the operation of the system of FIG. 4.

FIG. 4 depicts positioning system 120 of another embodiment of the present invention; where like reference numerals refer to like features previously described. System 120 includes control device 22 and flexure subsystem 126. Control device 22 is configured to supply control signal inputs to subsystem 126 and receive position feedback signals from subsystem 126 in the manner described in connection with system 20. Subsystem 126 provides the capability to control the position of a designated effector stage in the nanoscale regime using a kinematic chain. Subsystem 126 can also provide for translational position control without appreciable parasitic rotation.

Subsystem 126 includes an approximately planar plate 128, positioning mechanism 140, and sensing arrangement 170. FIG. 4 provides a partial, fragmentary view of plate 128. For the depicted embodiment, plate 128 is a monolithic structure that has been shaped to define base 130, stage 134, actuator mounting pads 143, and two translation adjustment flexure structures 144. Base 130, stage 134, pads 143, and structures 144 are formed by removal of material from a continuous plate to form intervening spaces 145 using standard photolithographic techniques. It should be appreciated that such techniques can be utilized to concurrently prepare a number of mechanisms 140 from a single plate 128. In one particular form, plate 128 can be a wafer/disk of the type commonly used in integrated circuit semiconductor manufacture.

Base 130, stage 134, and each of the two structures 144 are interconnected by elastically deformable regions to provide different flexures that are more specifically designated as flexure connections 154 in FIG. 4. Referring additionally to FIG. 5, connections 154 also each correspond to a flexure hinge 156 with respective pivot points P1–P9 for each structure 144 as shown in FIG. 5. Only a few of spaces 145, connections 154, and hinges 156 are designated by reference numerals in FIGS. 4 and 5 to preserve clarity.

Positioning mechanism 140 includes two actuators 142, two translation adjustment flexure structures 144, and stage 134. As in the case of mechanism 40, mechanism 140 can include more or fewer actuators and/or flexure structures. Flexure structures 144 are comprised of linkages 146 that are directly coupled to base 130 and stage 134 via flexure connections 154. Linkages 146 are comprised of actuator mounting pads 143, links 150, and intermediate members 158. Links 150 include base links 162, stage links 164, actuation coupling links 168, and actuator arm links 166. On one longitudinal side of each intermediate member 158, two base links 162 are coupled by two corresponding connections 154, which are in turn coupled to base 130 via two corresponding connections 154. At the opposing longitudinal side of each intermediate member 158, two stage links 164 are coupled by two corresponding connections 154, which are in turn coupled to stage 134 via two corresponding connections 154. For each pair of base links 162 coupled to a give intermediate member 158, one base link 162 is also coupled to an actuation coupling link 168 by a corresponding flexure connection 154, which in turn is coupled to a corresponding actuator arm link 166 by a corresponding flexure connection 154. Each link 166 is also coupled to base 130 and a corresponding actuator pad 143 by flexure connections 154.

Each of the two actuators 142 bridges two pads 143—one being connected to a corresponding link 166 and the other of being connected to base 130. Each actuator 142 is a linear type that is responsive to signals from control device 22 to selectively exert a force on the respective arm link 166, as designated by arrows F3 and F4 with like labeling. Actuators 142 may be the same as any of the actuators 42a and 42b previously described or differ as would occur to one skilled in the art. Like actuators 142, sensing arrangement 170 is coupled to control device 22 to provide stage position displacement signals for processing in the manner previously described. Sensing arrangement 170 may be the same as arrangement 70 previously described or differ as would occur to one skilled in the art.

FIG. 5 schematically depicts subsystem 126 in a rest state with no force being applied by either actuator 142. The kinematic chain formed by structures 144 each correspond to two simple quadrangles that are more particularly in the form of parallelograms with a common side. Parallelograms 182 correspond to base links 162 and parallelograms 184 correspond to stage links 164. In response to a change in force exerted by actuator 142, the connection 154 of link 166 to base 130 deforms, resulting in a pivoting motion. It should be appreciated that the point where force is applied along arm link 166 is proportional to the desired magnitude of movement at its end opposite the connection to base 130.

Considering both FIGS. 4 and 5, certain operational aspects of system 120 are further described. System 120 can provide adjustment of stage 134 along the x axis by activating one of the actuators 142 or the other. In response to the movement of arm link 166 due to exertion of a compressive force F3 or F4 from one of actuators 142, the remaining links and intermediate members 158 move by pivoting about pivot points P1–P9. The corresponding pair of parallelograms 182 and 184 reconfigure changing the distance along the x axis between base 130 and stage 134. With the application of force from only one activator 142, both structures deform to facilitate a displacement of stage 134 along the x axis. When compressive force F3 is applied with one actuator 142, displacement of stage 134 can be controlled over a range corresponding to distance DX3 along the x axis, as shown in FIG. 5. When force F4 is applied with the other actuator 142, displacement of stage 134 can be controlled over a range corresponding to distance DX4 along the x axis, as shown in FIG. 5. When neither force F3 nor F4 is applied, the elastic deformation caused by application of force F3 or F4 ceases, and stage 134 returns to a neutral, at rest position. When both compressive forces F3 and F4 are applied, displacement along the y axis results depending on the relative difference in applied force between forces F3 and F4. For example, by applying different degrees of force to each actuator 142 at the same time, a combination of x axis and y axis displacement can be provided. Displacement along the y axis can be controlled over a range corresponding to distance DY3 in FIG. 5. Alternative orientation of one or more of structures 144 can be utilized and/or additional linkages 146 and actuators 142 can be used to provide adjustment in a different manner.

Figure 6:
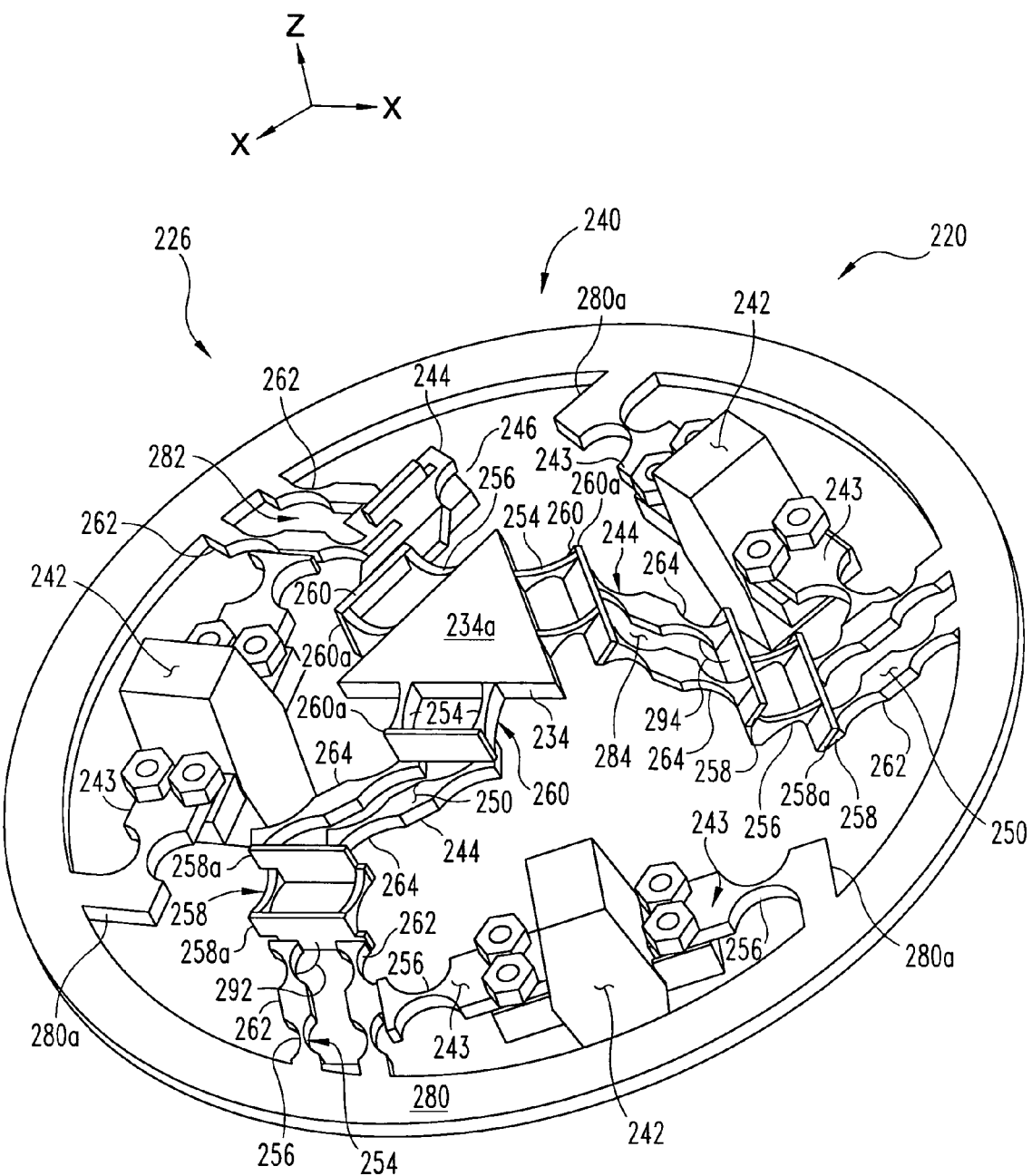
FIG. 6 is a perspective view of still another type of micropositioning system.
Figure 7:
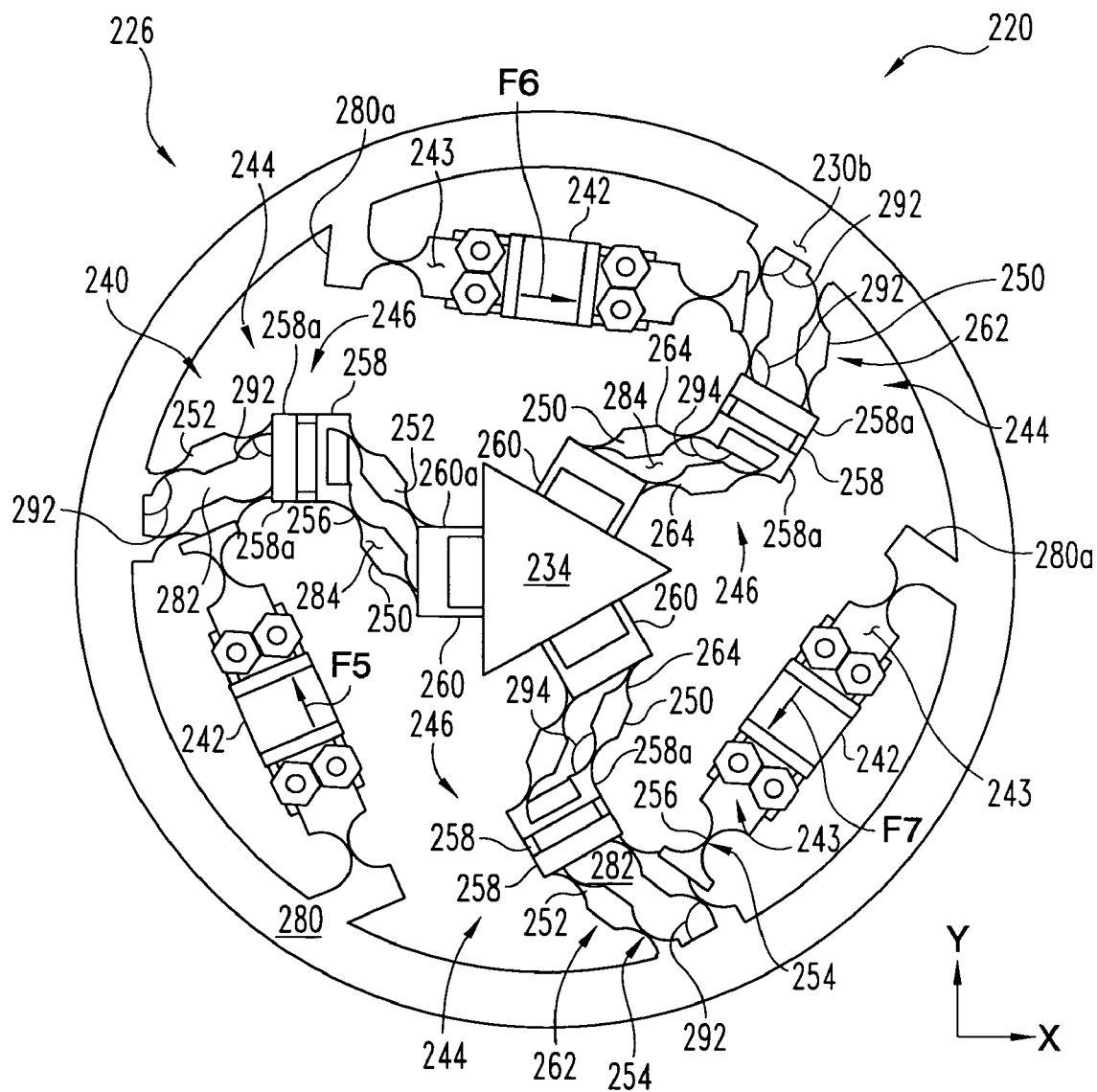
FIG. 7 is a top plan view of the micropositioning system of FIG. 6 with selected aspects shown in schematic form.
Figure 8:
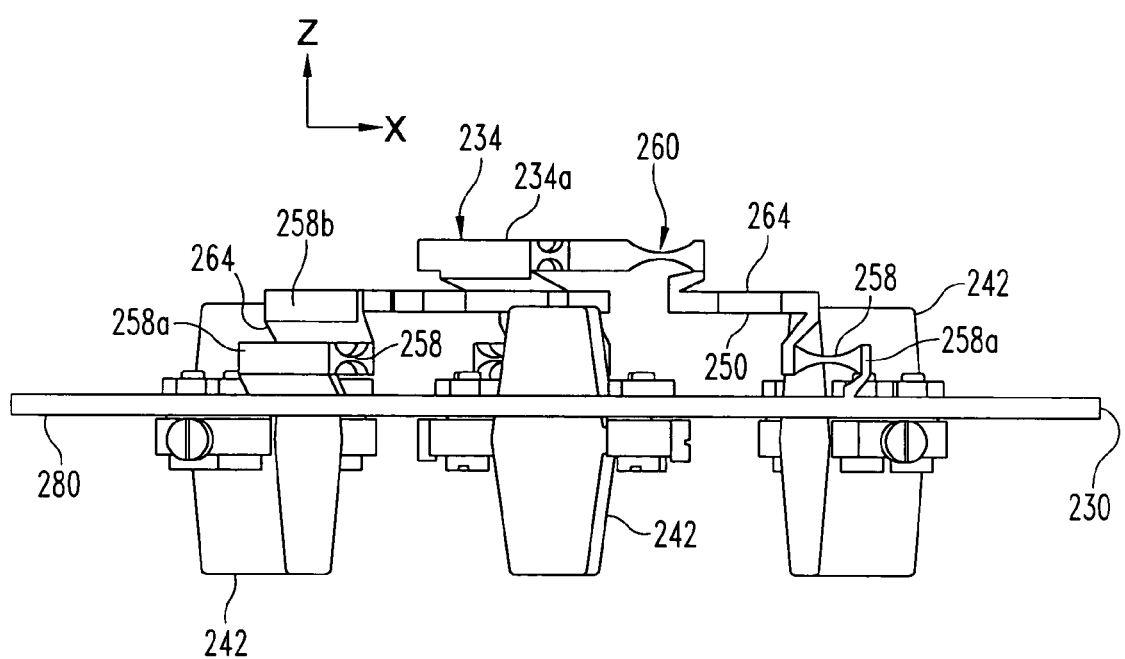
FIG. 8 is a side view of the micropositioning system of FIG. 6.

FIGS. 6–8 depict positioning system 220 of yet another embodiment of the present invention; where like numerals refer to like features previously described. System 220 includes a control device (not shown) that may be the same as control device 22. The control device 22 provides position control signals to subsystem 226 and receives position feedback signals from subsystem 226 via a sensing arrangement (also not shown). The sensing arrangement may be the same as that previously described—being structured to detect displacement along one or more reference axes and provide appropriate feedback to regulate position with control device 22. Subsystem 226 provides the capability to control the position of a designated effector stage in the nanoscale regime using a kinematic chain relative to a three dimensional region, as represented by the x, y, and z axes shown in the perspective view of FIG. 6

Subsystem 226 includes base 280 with a ring-like shape and positioning mechanism 240. As depicted, base 280 peripherally encloses positioning mechanism 240. Mechanism 240 includes stage 234, three actuators 242, corresponding actuator mounting pads 243, and translation adjustment flexure structures 244 interconnected by elastically deformable regions more specifically designated as flexure connections 254. As previously described for the embodiments of FIGS. 1–5, connections 254 each provide hinge 256 with a pivot point that operates by elastic deformation in response to application of a sufficient force. It should be appreciated that not all connections 254 and corresponding hinges 256 may be specifically designated by reference numerals to preserve clarity.

Stage 234 is approximately shaped as an equilateral triangle to provide triangular platform 234a. The three flexure structures 244 are each pivotally connected to a different side of platform 234a and correspondingly engaged by a different one of the three actuators 242. The actuators 242 are each connected to base 280 by a corresponding actuator anchor tab 280a. Collectively, anchor tabs 280a also approximately correspond to a triangular geometry. Structures 244 are comprised of linkages 246 that include a number of links 250 interconnected by connections 254. Connections 254 each correspond to a different hinge 256. Only a few of links 250 are designated by reference numeral to preserve clarity. Links 250 include two base links 262 connected to base 280 for each structure 244. From one structure 244 to the next, the base connections of base links 262 are generally equally positioned along the circumference defined by base 280, again corresponding to a triangle-like geometry, with angular spacing of about 120 degrees. Links also include two stage links 264. A vertical adjustment substructure 258 is connected between the two base links 262 and the two stage links 264 for each structure 244. Substructure 258 has two relatively rigid members 258a coupled by two connections 254. For each structure 244, the two base links 262 are connected to one of the members 258a opposite the base link connections to base 280 and the two stage links 264 are connected to the other member 258a of the given vertical adjustment substructure 258. Stage links 264 are also connected to vertical adjustment substructure 260. Substructure 260 has a relatively rigid member 260a connected by two connections 254 to stage 234.

Referring to FIGS. 6–8 generally, it should be appreciated that structures 244 each include a four bar linkage like that in structure 44a and structure 144 with an intermediate vertical adjustment substructure 258 in place of an intermediate member. Also, each structure 144 includes an additional adjustment vertical adjustment substructure 260 between the stage links 264 and stage 234; as compared to earlier described embodiments. For each structure 244, the hinges 256 for base links 262 have generally parallel pivot axes, and the hinge connections 256 for stage links 264 have generally parallel pivot axes. The pivot points for the two connections 254 for each of vertical adjustment substructures 258 and 260 are generally coaxial—being along the same pivot axis. The pivot axes for each vertical adjustment substructure 258 and 260 extends transverse to the pivot axes of any of the corresponding base links 262 and stage links 264 of a given structure 244. For each structure 244, the two base links 262 and intermediate vertical adjustment substructure 258 correspond to oblique parallelogram 282 and the two corresponding stage links 264 and vertical adjustment substructure 258 correspond to oblique parallelogram 284, which collectively define a compound parallelogram structure. More generally, this structure can be characterized as two simple quadrangles, of which parallelograms are a particular subcategory. Interior angles 292 and 294 are also symbolically illustrated in FIG. 7 for parallelograms 282 and 294, respectively. It should be understood that reference numerals 282, 284, 292, and 294 may not appear in all instances to enhance clarity of FIG. 7.

Actuators 242 are each fixed to bridge across two pads 243 between a corresponding structure 244 and tab 280a via two connections 254. Actuators 142 operate linearly and may be of any type such as those previously described in connection with the embodiments of FIGS. 1–5. As shown more specifically in FIG. 7, actuators 142 are structured to selectively exert a respective force F5, F6, and F7 in response to input from a control device (not shown). Such forces are represented by like-labeled arrows. In response to a sufficient change in force, the links 50 of the respective structure 144 pivot relative to one another at corresponding connections 254 to change position of stage 134. It should be appreciated that in response to a compressive force from actuators 42a or 42b of system 20 (FIGS. 1–3), the respective structure 44a or 44b extended the distance between stage 34 and base portion 30a or 30b. In contrast, structures 244 are arranged to decrease the distance between stage 234 and base 280 when a compressive force is applied with actuator 242.

Mechanism 240 is arranged to provide for positioning of stage 234 relative to a region of an x-y plane as perhaps best represented by the top view of FIG. 7. However, structures 244 are further arranged to impart stress on one structure 244 to another structure 244 through stage 234 to selectively deform connections 254 for one or more of vertical adjustment substructures 258 and 260, providing a third adjustable direction along the z axis perpendicular to the x-y plane. It should further be appreciated that mechanism 240 can be structured to provide a consistent z axis movement component over a specified range in addition to or as an alternative to movement along the x axis or y axis in response to a given change in applied force with one or more of actuators 242.

There are many different embodiments of the present invention envisioned. For example, more or fewer actuators can be utilized in other embodiments, and/or a different actuator type can be utilized. In another example, more or fewer elastically pivotal flexure structures corresponding to compound parallelograms may be used. Also, while some parts of the embodiments are described as monolithic, in different embodiments, such parts can be assembled together from two or more constituents. Translation adjustment structures of the present application can be actuated by pushing, pulling, and/or rotating a structure link with an actuator. In a further example, the application of force with a given actuator may be to a different link than that shown in any of the depicted embodiments, may vary from structure-to-structure, and/or multiple actuators may be applied to a single flexure structure.

A further example includes a flexure stage with a base, a stage, a positioning mechanism, and a control device. The stage and base are spaced apart and positioned opposite one another. A positioning mechanism is coupled between the base and the stage and is used to move the stage in translation along a reference axis. The positioning mechanism includes an actuator and a flexure structure. The flexure structure is engaged by the actuator and includes two base links. One end of the base links is connected to the base by flexure hinges while the other is connected to an intermediate link by flexure hinges. The intermediate link couples the base links with a pair of stage links. One end of each of the stage links is connected to the intermediate link by flexure hinges while the other is connected to the stage by flexure hinges. When the position of the stage is to be changed, a control device generates a control signal that is sent to the actuator. The actuator responds to the control signal by providing a force to elastically deform the flexure structure. The force provided by the actuator causes the base links to pivot relative to the base, the stage links to pivot relative to the stage, and the intermediate link to move relative to both the base and stage links.

Another example includes: providing a base coupled to a stage by a flexure structure where the stage is at a position relative to the base along a first axis; determining to reposition the stage relative to the base along the first axis; applying force to the flexure structure with an actuator to displace the intermediate link along a second axis transverse to the first axis and pivot the base links relative to the base and the stage links relative to the stage by elastic deformation of the first flexure structure; and, the stage moving relative to the base along the reference axis from the first position to a second position in response to the force. The flexure structure includes two base links each connected to the base with a respective flexure hinge, two stage links each connected to the stage with a respective flexure hinge, and an intermediate link connected to the base links and the stage links between the base and the stage.

Yet another example includes: a base with first and second base portions; a stage with a first stage portion spaced apart from the first base portion along a first axis and a second stage portion spaced apart from the second base portion along a second axis; a first positioning mechanism including a first actuator and a first flexure structure responsive to the first actuator to correspondingly move the stage in translation along the first axis relative to the base; and, a second positioning mechanism including a second actuator and a second flexure structure responsive to the second actuator to correspondingly move the stage in translation along the second axis relative to the base. The first flexure structure includes four or more links each having two corresponding flexure hinge connections. Each link responds to force from the first actuator by pivoting about two respective points with elastic deformation of the corresponding flexure hinge connections. The two respective points of each link defines a set of points that corresponds to the vertices of two simple quadrangles positioned between the first base portion and the first stage portion. The second flexure structure includes four or more other links with two other corresponding flexure hinge connections. Each of the links responds to force from the second actuator by pivoting about two respective points with elastic deformation of the corresponding flexure hinge connections. The two respective points of each link defines a different set of points that correspond to vertices of two other simple quadrangles positioned between the second base portion and the second stage portion.

Still a further example includes: operating a positioning mechanism to selectively position a stage relative to a base; applying an amount of force to the flexure structure with the actuator in response to a control signal from a control device; in response to the amount of force, each link pivoting about two respective points with elastic deformation of the corresponding flexure hinge connections; and, in response to the pivoting of the links, the stage moving in translation along an axis to a position a distance from the base. The positioning mechanism includes an actuator and a flexure structure. The flexure structure interconnects the base and the stage with four or more links that each includes two corresponding flexure hinge connections. The two respective points of each of the links define a set of points corresponding to vertices of two simple quadrangles positioned between the base and the stage. In a more particular form, the quadrangles are each in the form of a parallelogram.

For any of these examples, a preferred adjustment resolution is at least 1000 nanometers, a more preferred adjustment resolution is 100 nanometers or less, and an even more preferred adjustment resolution is 25 nanometers or less.

Any theory, mechanism of operation, proof, or finding stated herein is meant to further enhance understanding of the present invention and is not intended to make the present invention in any way dependent upon such theory, mechanism of operation, proof, or finding. While this application illustrates and describes representative embodiments, the invention is not intended to be coextensive therewith, it being understood that only selected embodiments have been shown and/or described and that all changes, modifications, and equivalents that come within the spirit of the invention as defined herein or by any of the following claims are desired to be protected.

What is claimed is:

1. An apparatus, comprising:
a base including a first base portion;
a stage including a first stage portion, the first stage portion being positioned opposite the first base portion and being spaced apart therefrom along a first reference axis;
a first positioning mechanism coupled between the base and the stage to move the stage in translation along a first reference axis, the first mechanism including a first actuator and a first flexure structure engaged by the first actuator, the flexure structure including two base links each with a base flexure hinge connection to the first base portion, two stage links each with a stage flexure hinge connection to the first stage portion, and a first intermediate link coupled to the base links and the stage links by corresponding flexure hinge connections; and
a control device operable to generate a control signal to change position of the stage along the first reference axis, the first actuator being responsive to the control signal to provide a force to elastically deform the first flexure structure and correspondingly move the first intermediate link transverse to the first axis, pivot each of the base links relative to the first base portion, and pivot the stage links relative to the first stage portion.

2. The apparatus of claim 1, wherein the base links are structured to pivot relative to a first set of four pivot points corresponding to vertices of a first simple quadrangle in response to force by the first actuator, and the stage links are structured to pivot relative to a second set of four pivot points each corresponding to vertices of a second simple quadrangle.

3. The apparatus of claim 2, wherein the first quadrangle and the second quadrangle are each an oblique parallelogram and further comprising means for sensing position of the stage relative to the base, the sensing means being coupled to the control device.

4. The apparatus of claim 2, wherein the base includes a second base portion, the stage includes a second stage portion, and the second stage portion is positioned opposite the second base portion and is spaced apart therefrom along a second reference axis, and further comprising:
a second positioning mechanism coupled between the second base portion and the second stage portion to move the stage in translation along the second reference axis, the second mechanism including a second actuator and a second flexure structure engaged by the second actuator, the flexure structure including two other base links each connected to the second base portion with a base flexure connection, two other stage links each connected to the second stage portion with a stage flexure connection, and a second intermediate link coupled to the base links and the stage links by respective flexure connections.

5. The apparatus of claim 4, wherein:
the base links are structured to pivot relative to a first set of four pivot points corresponding to vertices of a first simple quadrangle in response to force provided by the first actuator and the stage links are structured to pivot relative to a second set of four pivot points each corresponding to vertices of a second simple quadrangle;
the control device is operable to generate a further control signal to change position of the stage along the second reference axis;
the second actuator is responsive to the further control signal to elastically deform the second flexure structure to move the second intermediate link transverse to the second reference axis, pivot each of the other base links relative to a third set of four pivot points corresponding to vertices of a third simple quadrangle, and pivot the other stage links of the relative to a fourth set of four pivot points each corresponding to vertices of a fourth simple quadrangle; and
the first reference axis and the second reference axis are generally perpendicular to one another.

6. The apparatus of claim 1, wherein the base, the stage and the flexure structure are monolithic, the first intermediate link includes a first end portion opposite a second end portion, a first one of the base links is connected to the first end portion, a first one of the stage links is connected to the first end portion opposite the first one of the base links, a second one of the base links is connected to the second end portion, and a second one of the stage links is connected to the second end portion opposite the second one of the base links.

7. A method, comprising:
providing a base coupled to a stage by a first flexure structure, the stage being at a first position relative to the base along a first axis, the first flexure structure including two base links each connected to the base with a respective flexure hinge, two stage links each connected to the stage with a respective flexure hinge, and a first intermediate link connected to the base links and the stage links between the base and the stage;
sensing position of the stage with one or more sensors operatively coupled to a control device;
in response to the control device, applying force to the first flexure structure with an actuator to displace the first intermediate link along a second axis transverse to the first axis and pivot the base links relative to the base and the stage links relative to the stage by elastic deformation of the first flexure structure; and
in response to the force, the stage moving relative to the base along the reference axis from the first position to a second position.

8. The method of claim 7, which includes:
providing a second flexure structure including two other base links each connected to the base by a corresponding flexure hinge, two other stage links each connected to the stage by a corresponding flexure hinge, and a second intermediate link connected to the other base links and the other stage links between the base and the stage;
elastically deforming the second flexure structure with another actuator to move the stage in translation along the second axis.

9. The method of claim 8, wherein the first axis and the second axis are approximately perpendicular to one another to define a planar movement area adjusted with the first flexure structure and the second flexure structure, and which includes adjusting the stage with the control device to a resolution of 100 nanometers or less.

10. The method of claim 7, wherein the base links move relative to a first set of points corresponding to vertices of a first parallelogram and the stage links move relative to a second set of points corresponding to vertices of a second parallelogram.

11. The method of claim 7, wherein the base, the stage, and the first flexure structure are integrally structured and coplanar.

12. An apparatus, comprising:
a base including a first base portion and a second base portion;
a stage including a first stage portion spaced apart from the first base portion along a first axis and a second stage portion spaced apart from the second base portion along a second axis;
a first positioning mechanism including a first actuator and a first flexure structure responsive to the first actuator to correspondingly move the stage in translation along the first axis relative to the base, the first flexure structure including four or more links each including two corresponding flexure hinge connections, each respective one of the links being responsive to force from the first actuator to pivot about two respective points with elastic deformation of the corresponding flexure hinge connections, the two respective points of each of the links defining a set of points, the set of points corresponding to vertices of two simple quadrangles positioned between the first base portion and the first stage portion;
a second positioning mechanism including a second actuator and a second flexure structure responsive to the second actuator to correspondingly move the stage in translation along the second axis relative to the base, the second flexure structure including four or more other links each including two other corresponding flexure hinge connections, each respective one of the other links being responsive to force from the second actuator to pivot about two respective other points with elastic deformation of the corresponding other flexure hinge connections, the two other respective points of each of the other links defining a different set of points, the different set of points corresponding to vertices of two other simple quadrangles positioned between the second base portion and the second stage portion; and
a control device coupled to the first actuator and the second actuator.

13. The apparatus of claim 12, wherein the two simple quadrangles and the two other simple quadrangles are each one of four oblique parallelograms and further comprising a control device and a sensor arrangement, the control device being coupled to the sensor arrangement, the first actuator, and the second actuator to control stage position with the first flexure structure and the second flexure structure based on position sensed with the sensor arrangement.

14. The apparatus of claim 12, further comprising means for sensing stage position operatively coupled to the control device, and means for providing an adjustment resolution of the stage of less than or equal to 100 nanometers.

15. The apparatus of claim 12, wherein the links include a first pair connected to the base and a second pair connected to the stage, the first flexure structure further includes an intermediate member connected between the first pair and the second pair, the intermediate member being displaced transverse to the first axis in response to changing the force provided with the first actuator.

16. The apparatus of claim 12, further comprising a third positioning mechanism including a third actuator responsive to the control device, and a third flexure structure responsive to the third actuator to correspondingly move the stage in translation along the third axis relative to the base, the third flexure structure including four or more further links each including two further corresponding flexure hinge connections, each respective one of the further links being responsive to force from the third actuator to pivot about two respective further points with elastic deformation of the corresponding further flexure hinge connections, the two further respective points of each of the further links defining a further set of points, the further set of points corresponding to vertices of two further simple quadrangles positioned between the base and the stage, the first axis, the second axis, and the third axis being approximately orthogonal relative to one another.

17. A method, comprising:
operating a first positioning mechanism to selectively position a stage relative to a base, the first positioning mechanism including a first actuator and a first flexure structure, the first flexure structure interconnecting the base and the stage with four or more links, the links each including two corresponding flexure hinge connections;
applying a first amount of force to the flexure structure with the first actuator in response to a first control signal from a control device;
in response to the first amount of force, each respective one of the links pivoting about two respective points with elastic deformation of the corresponding flexure hinge connections, the two respective points of each of the links defining a set of points, the set of points corresponding to vertices of two parallelograms positioned between the base and the stage, the parallelograms each defining a set of four oblique interior angles; and
in response to the pivoting of the links, the stage moving in translation along a first axis to a first position, the first position being a first distance from the base.

18. The method of claim 17, which includes:
operating a second positioning mechanism to selectively position the stage relative to the base along a second axis, the second positioning mechanism including a second actuator and a second flexure structure, the second flexure structure interconnecting the base and the stage with four or more other links, the other links each including two respective flexure hinge connections;
elastically deforming the second flexure structure with the second actuator in response to a second first from the control signal;
in response to said deforming, each respective one of the other links pivoting about two corresponding points of the respective flexure hinge connections, the two corresponding points of each of the other links defining a group of points, the group of points corresponding to vertices of two other parallelograms positioned between the base and the stage; and
in response to the pivoting of the other links, the stage moving in translation along the second axis.

19. The method of claim 17, which includes:
adjusting the first actuator to provide a second amount of force to the flexure structure different than the first amount of force;
in response to the second amount of force, each respective one of the links pivoting about the two respective points to change the set of four oblique interior angles; and
in response to the pivoting of the links, the stage moving in translation along the first axis to a second position, the second position being a second distance from the base, the second distance being different that the first distance.

20. The method of claim 17, wherein the links include a first pair connected to the base and a second pair connected to the stage, the first flexure structure further including an intermediate member connected between the first pair and the second pair by the corresponding flexure hinge connections, the intermediate member being displaced transverse to the first axis with the elastic deformation of the corresponding flexure hinge connections.

21. The method of claim 17, wherein the first axis and the second axis are approximately perpendicular to one another to define a planar stage movement area adjusted with the first flexure structure and the second flexure structure.

* * * * *